United States Patent
Seo et al.

(10) Patent No.: US 7,327,529 B2
(45) Date of Patent: Feb. 5, 2008

(54) DECK FOR MAGNETIC RECORDING/REPRODUCING APPARATUS

(75) Inventors: Jae-Kab Seo, Suwon-si (KR); Myoung-Joon Kim, Suwon-si (KR); Bong-Joo Kim, Suwon-si (KR); Jun-Young Kim, Suwon-si (KR); Chung-hum Baik, Suwon-si (KR); Young-Ho Cho, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 411 days.

(21) Appl. No.: 11/061,520

(22) Filed: Feb. 22, 2005

(65) Prior Publication Data

US 2005/0280926 A1    Dec. 22, 2005

(30) Foreign Application Priority Data

Jun. 18, 2004    (KR)    ............... 10-2004-0045305

(51) Int. Cl.
    *G11B 15/675*    (2006.01)
(52) U.S. Cl. ...................................... 360/85
(58) Field of Classification Search ............... 360/96.5
    See application file for complete search history.

(56) References Cited

U.S. PATENT DOCUMENTS 4,809,115 A    2/1989    Shibata et al.
5,057,961 A    10/1991    Rayis
5,486,958 A *   1/1996    Choi et al. ................. 360/85

FOREIGN PATENT DOCUMENTS

| JP | 2001-135001 | 5/2001 |
| JP | 2001-176154 | 6/2001 |
| KR | 1999-13035 | 4/1999 |
| KR | 0319026 | 7/2003 |

\* cited by examiner

*Primary Examiner*—William R. Korzuch
*Assistant Examiner*—Mark Blouin
(74) *Attorney, Agent, or Firm*—Roylance, Abrams, Berdo & Goodman, L.L.P.

(57) ABSTRACT

Disclosed is a deck for a magnetic recording/reproducing apparatus. The deck has a chassis in which a plurality of structures constituting a mechanical mechanism for loading a tape and recording or reproducing information; and a switch/sensor circuit board in which a plurality of switches and sensors constituting an electronic mechanism for detecting an operation of the deck and a state of the structures. The switch/sensor circuit board is formed of a PCB and assembled to a lower surface of the chassis.

7 Claims, 5 Drawing Sheets

DECK FOR MAGNETIC RECORDING/REPRODUCING APPARATUS

CROSS-REFERENCE TO RELATED APPLICATIONS

This application claims the benefit under 35 U.S.C. §119 (a) of Korean Patent Application No. 2004-45305, filed on Jun. 18, 2004, the entire contents of which is incorporated herein by reference.

BACKGROUND OF THE INVENTION

1. Field of the Invention

The present invention relates to a deck for a magnetic recording/reproducing apparatus.

2. Description of the Related Art

Generally, a magnetic recording/reproducing apparatus, such as a Video Cassette tape Recorder (VCR) and a Digital Versatile Camcorder (DVC)), which uses a magnetic tape as a recording medium, mainly includes a deck which records or reproduces desired information while running a tape out of a cassette, a photographing unit and a signal processing unit.

FIG. 1 schematically shows a deck for a conventional magnetic recording/reproducing apparatus.

Referring to FIG. 1, the deck for the conventional magnetic recording/reproducing apparatus comprises a main chassis 10 and a sub-chassis 20 disposed to be slidable with respect to the main chassis 10. Meanwhile, a cassette housing (not shown), in which a cassette tape is mounted, is disposed in the sub-chassis 20 so as to move up and down with respect to the sub-chassis 20.

In the main chassis 10, there are properly disposed a head drum 11, a loading motor 12, a capstan motor 13 and a plurality of guide rollers 14 and guide poles 15 forming a tape running system.

In the sub-chassis 20, there are properly disposed a pair of reel tables 21 and 22 for driving a reel of the cassette tape, an idle gear assembly 23 for selectively supplying power to one of the reel tables 21 and 22, and a reel cover 24 for supporting the idle gear assembly 23.

A mode switch 16 for controlling an operation mode, and a humidity sensor (not shown) are disposed in the main chassis. At the sub-chassis 20, there are provided a cassette switch 25 for detecting the insertion and withdrawal of the cassette tape, an MIC switch 26 for recognizing the type of cassette tape, a reel sensor (not shown) for checking a number of revolution and an operational state of the reel tables 21, 22, and a start/end sensor 27 for recognizing a start point and an end point of a tape. A light-emitting device 28 for radiating light to the start/end sensor 27 is disposed in a holder 24a provided at the reel cover 24.

Meanwhile, the deck for the conventional magnetic recording/reproducing apparatus is provided with a plurality of Flexible Printed Circuit Board (FPCB), which connect each component with a main circuit board (not shown), to control an operation of each component. The FPCB is formed of a flexible plastic sheet on which a precise circuit is printed, and more expensive than a typical Printed Circuit Board (PCB).

Out of the plurality of FPCBs, a trans FPCB 31 is to connect the head drum 11 and the main circuit board, a loading FPCB 32 is to connect the loading motor 12 and the main circuit board, and a capstan FPCB 33 is to connect the capstan motor 13 and the main circuit board. Further, a mode FPCB 34 is to connect the humidity sensor and the mode switch 16 disposed in the main chassis 10 and the main circuit board. Finally, a sub FPCB 35 is to connect the cassette switch 25, the MIC switch 26, the reel sensor, the start/end sensor 27 and the light emitting device 28 disposed in the sub-chassis 20 and the main circuit board.

Since the mode FPCB 34 and the sub FPCB 35 pass through the plurality of components, the mode FPCB 34 and the sub FPCB 35 are widely disposed in the corresponding chassis 10, 20. Therefore, there is a problem that the manufacturing cost is increased since a great quantity of high-priced FPCB is used in the deck and chassis of the conventional magnetic recording/reproducing apparatus.

Further, since the deck of the conventional magnetic recording/reproducing apparatus is divided into the main chassis 10 and the sub-chassis 20, reducing the size of the deck is limited. Particularly, since the deck can not use the typical PCB instead of the high-priced FPCB due to its size, the manufacturing cost is increased.

Furthermore, in the deck for the conventional magnetic recording/reproducing apparatus, the mode switch 16 and the humidity sensor, the cassette switch 27, the MIC switch 26, the reel sensor, the start/end sensor 27 and the light emitting device 28 are separately disposed in each of the main chassis 10 and the sub-chassis 20, and therefore, there is another problem that it is necessary to use the mode FPCB 34 and the sub FPCB 35 and connecting portions for connecting, which requires the number of the components with the main board to be high. If the number of connecting portions is increased, as described above, the number of assembling processes is increased, and the degree of design freedom in the main circuit is restricted.

SUMMARY OF THE INVENTION

Accordingly, the present invention is directed to a deck for a magnetic recording/reproducing apparatus that substantially obviates one or more of the above problems, which are due to limitations and disadvantages of the related art.

An object of the present invention is to provide a deck for a magnetic recording/reproducing apparatus, in which a single chassis structure is employed, thereby minimizing the size of the deck, and in which all of the switches and sensors for operating the deck are disposed in a single circuit board, thereby reducing the connecting portions for connecting the components with the main circuit board.

Another object of the present invention is to provide a deck for a magnetic recording/reproducing apparatus, in which a low-priced typical PCB is employed, thereby significantly reducing the manufacturing cost of the device.

To achieve these and other advantages and in accordance with the purpose of the present invention, as embodied and broadly described, a deck for magnetic recording/reproducing apparatus comprises a chassis in which a plurality of structures constituting a mechanical mechanism for loading a tape and recording/reproducing information; and a switch/sensor circuit board in which a plurality of switches and sensors constituting an electronic mechanism for detecting an operation of the deck and the state of the various structures.

According to one embodiment of the present invention, the switch/sensor circuit board is assembled to a lower surface of the chassis. Further, the switch/sensor circuit board can be formed of a low-priced typical PCB or a high-priced FPCB. However, in an aspect of the cost, it is preferred that the deck be formed of the typical PCB.

The plurality of structures constituting the mechanical mechanism comprises a reel assembly having a reel table for driving a reel of a cassette tape, a tape running guide assembly having a loading motor and a plurality of guide members for withdrawing the tape out of the cassette tape and then running the tape along a desired path, and a head drum assembly having a magnetic head for recording the information on the tape running along the desired path and reproducing the recorded information.

And the plurality of switches and sensors constituting the electronic mechanism comprises a mode switch for controlling a mode, a humidity sensor, a cassette switch for detecting an insertion and withdrawal of the cassette tape, an MIC switch for recognizing a type of cassette tape, a reel sensor for checking the number of revolutions and an operational state of the reel table, a start/end sensor for recognizing a start point and an end point of the tape, and a light-emitting device for radiating light to the start/end sensor.

Further, the switch/sensor circuit board is provided with a holder for supporting the light-emitting device, and the switch/sensor circuit board is fixed to the chassis using hooks respectively formed at the holder and the MIC switch.

Furthermore, the switch/sensor circuit board may be assembled to the chassis using hooks respectively formed at the holder and the MIC switch, and then preferably fixed by a screw or other fixing means, such as a snap-fit device.

Preferably, the switch/sensor circuit board is provided with a connector for outputting signals of the switches and sensors. The connector and the main circuit board are connected to each other by a FPCB.

According to embodiments of the present invention, the deck for a magnetic recording/reproducing apparatus has only one chassis and only one switch/sensor circuit board.

BRIEF DESCRIPTION OF THE DRAWINGS

The above aspects and features of the present invention will be more apparent by describing certain embodiments of the present invention with reference to the accompanying drawings, in which.

Throughout the drawings, it should be understood that like reference numbers refer to like features, structures and elements.

DETAILED DESCRIPTION OF EXEMPLARY EMBODIMENTS

Reference will now be made in detail to the preferred embodiments of the present invention, examples of which are illustrated in the accompanying drawings.

Figure 1:
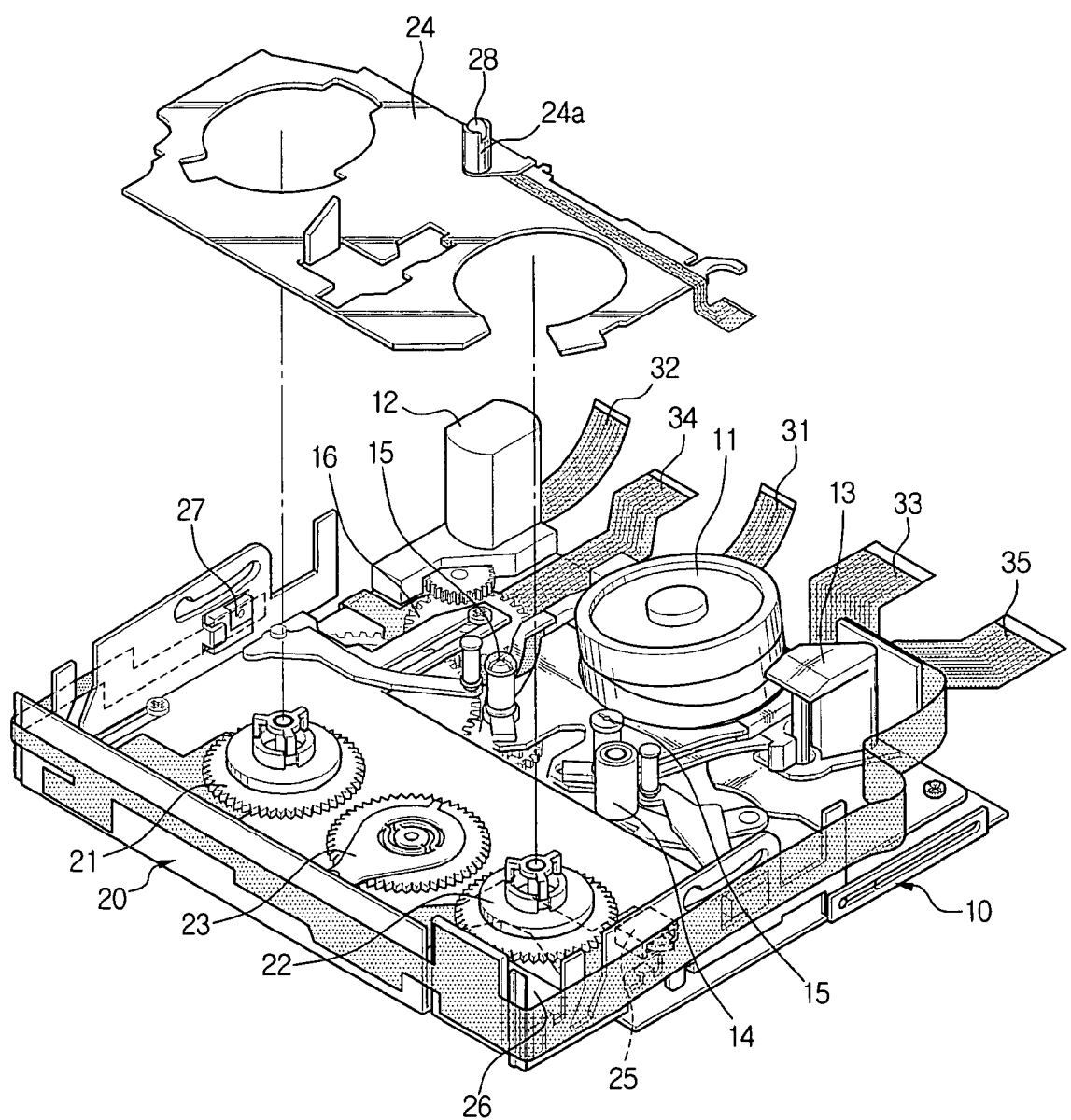
FIG. 1 is a schematic perspective view of a deck for a conventional magnetic recording/reproducing apparatus.
Figure 2:
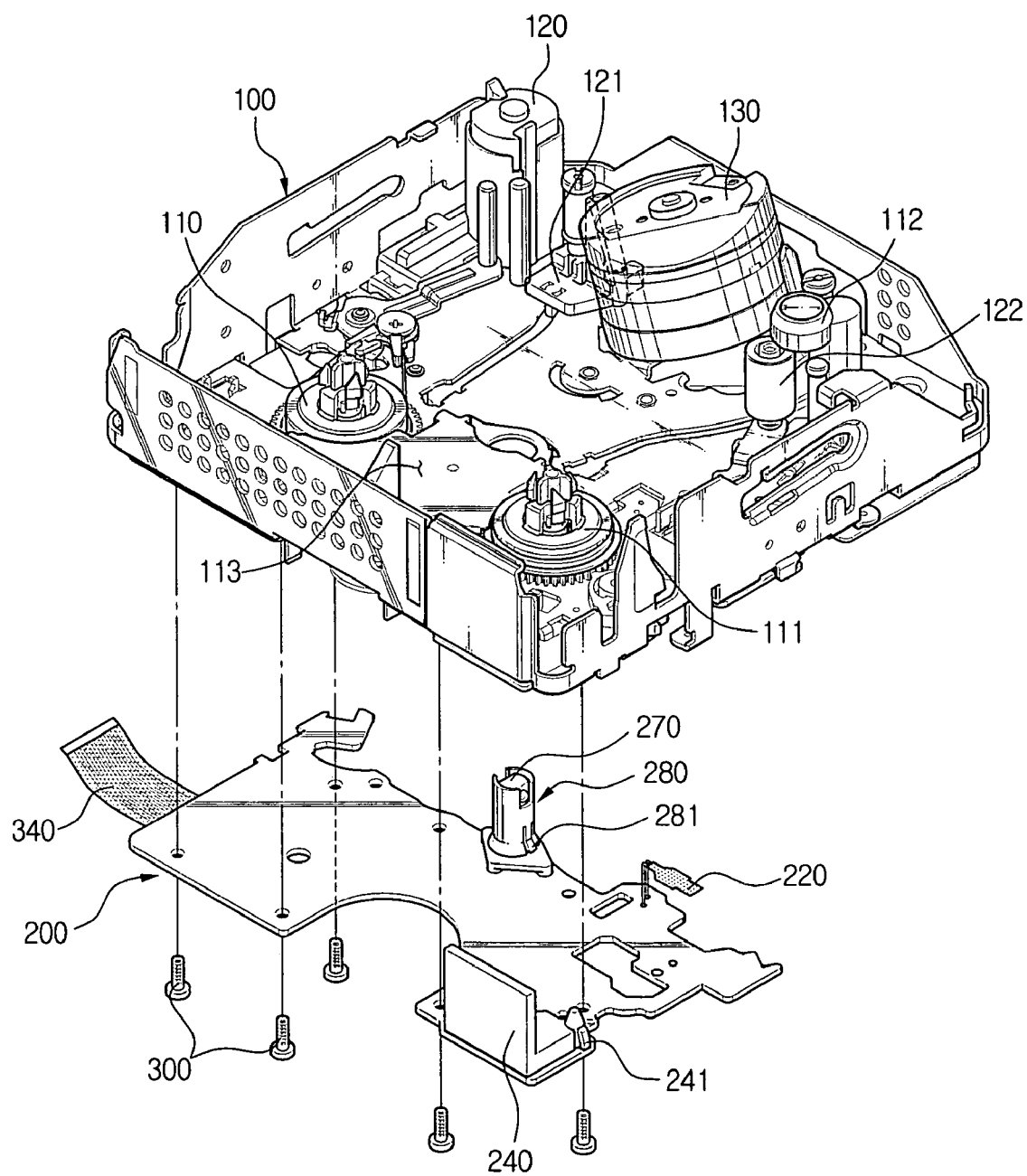
FIG. 2 is an exploded perspective view of a deck for magnetic recording/reproducing apparatus according to an embodiment of the present invention.
Figure 3:
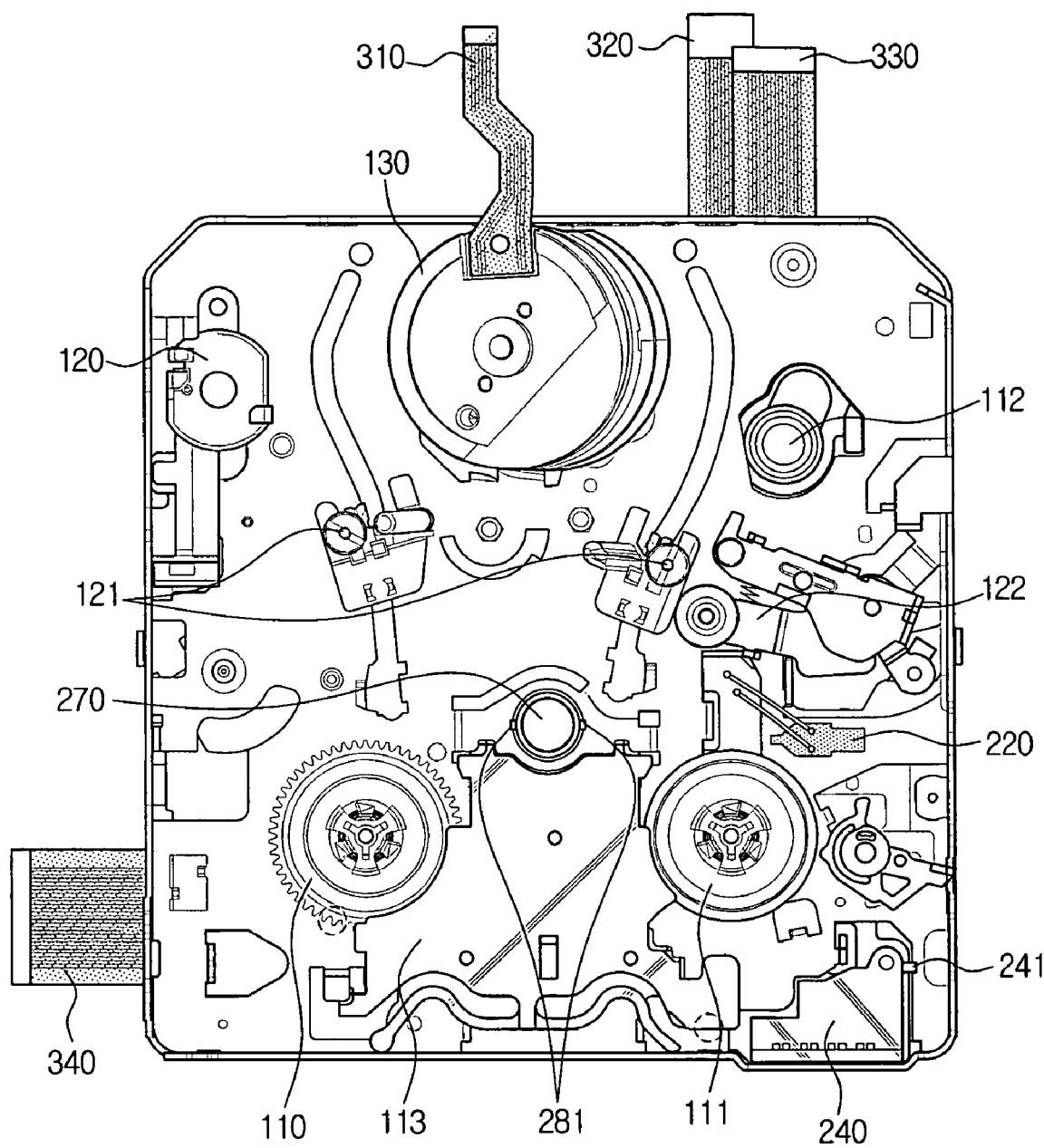
FIG. 3 is a plan view of FIG. 2 in an assembled status.
Figure 4:
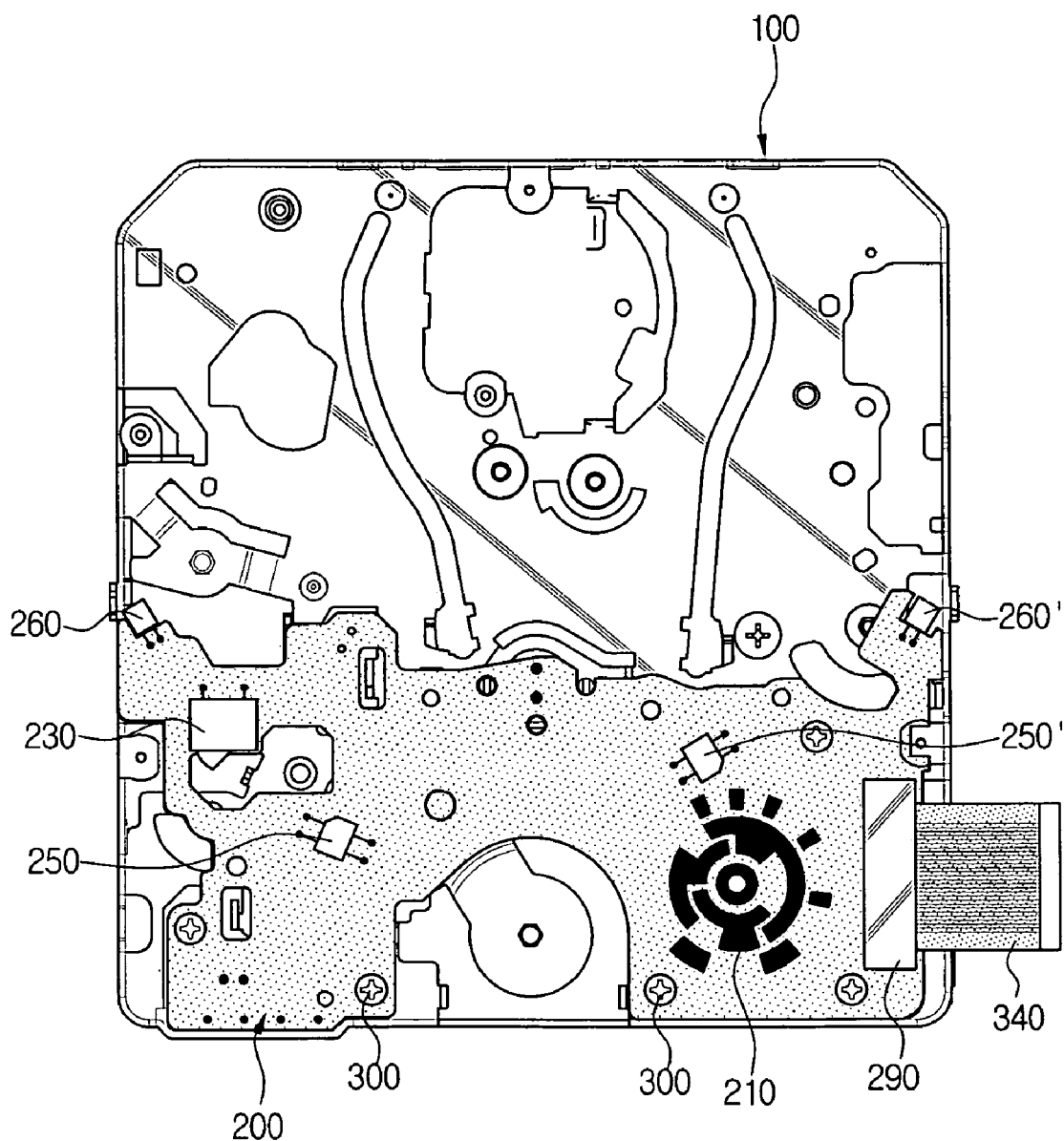
FIG. 4 is a lower view of FIG. 2.

FIGS. 2 and 4 schematically show a deck for magnetic recording/reproducing apparatus according to an embodiment of the present invention. A reference numeral 100 designates a chassis, 200 is a switch/sensor circuit board.

In the chassis 100, a plurality of structures are formed, constituting a mechanical mechanism for loading a tape and a recording/reproducing information. In the switch/sensor circuit board, a plurality of switches and sensors are formed, constituting an electronic mechanism for detecting an operational state of the deck and the structures. The deck for a magnetic recording/reproducing apparatus of the present embodiment further comprises a cassette housing (not shown) in which a cassette tape is disposed.

The plurality of structures constituting the mechanical mechanism comprises a reel assembly having a reel table 110, 111 for driving a reel of the cassette tape, a tape running guide assembly having a loading motor 120 and a plurality of guide members 121 and 122 for withdrawing the tape out of the cassette tape and then running the tape along a desired path, and a head drum assembly 130 having a magnetic head for recording the information or reproducing recording information on the tape running along the desired path.

The reel assembly is provided with a capstan motor 112 as a driving source, an idle gear (not shown) for selectively transmitting power of the capstan motor 112 to the reel table 110, 111, and a reel cover 113 for supporting the idle gear.

The guide members 121, 122 comprise a pole base assembly and a pinch arm assembly.

Meanwhile, the plurality of switches and sensors constituting the electronic mechanism comprises a mode switch 210 for controlling an operation mode, a humidity sensor 220, a cassette switch 230 for detecting an insertion and withdrawal of the cassette tape, an MIC switch 240 for recognizing a type of cassette tape, a reel sensor 250, 250' for checking a number of revolution and an operational state of the reel table 110, 111, a start/end sensor 260, 260' for recognizing a start point and an end point of the tape, and a light-emitting device 270 for radiating light to the start/end sensor 260, 260', etc.

The light-emitting device 270 is disposed in a holder 280 fixed to the switch/sensor circuit board 200, and the MIC switch 240 is also fixed to a corresponding position of the switch/sensor circuit board 200.

Figure 5A:
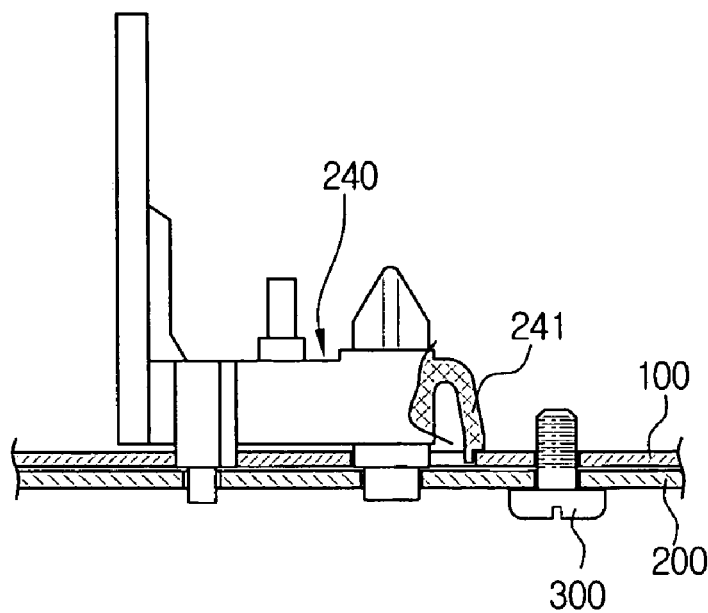
FIGS. 5A and 5B are cross-sectional views of main portions showing a structure of assembling a switch/sensor circuit board to a chassis of the deck according to the present invention.
Figure 5B:
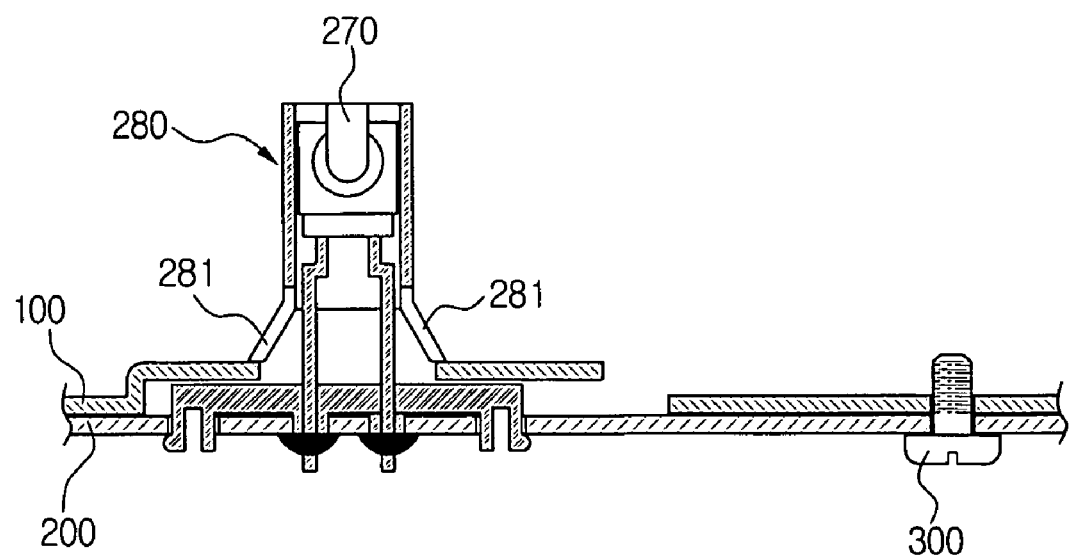

The holder 280 and the MIC switch 240 are each provided with hooks 281 or hook 241, respectively. As shown in FIGS. 5A and 5B, when the switch/sensor circuit board 200 is assembled to the chassis 100 from a lower side of the chassis 100, the hooks 281, 241 are respectively hooked at the chassis 100, thereby maintaining the assembled state of the switch/sensor circuit board 200 and the chassis 100. Alternatively, screws 300 or any other suitable assembling means may be used by themselves or in combination with hooks 281 and hook 241 to assemble the switch/sensor circuit board 200 to the chassis 100.

In addition, the switch/sensor circuit board 200 is further provided with a connector 290 for outputting signals of the switches and the sensors to the outside.

The switch/sensor circuit board 200 of the deck according to an embodiment of the present invention, as described above, can be formed of any one of a PCB and a FPCB. However, in the aspect of reducing cost, it is preferred that the deck is formed of the lower priced, typical PCB.

Meanwhile, reference numerals 310 through 340 preferably designate FPCBs for connecting the components to a main circuit board (not shown). A trans FPCB 310 out of the plurality of FPCBs is to connect the head drum assembly 130 and the main circuit board, a motor FPCB 320 is to connect the loading motor 120 and the main circuit board, and a capstan FPCB 330 is to connect the capstan motor 112 and the main circuit board. Finally, one end of a switch/sensor FPCB 340 is connected to the connector 290 of the switch/sensor circuit board 200, and the other end is connected to the main circuit board so as to form a signal outputting structure of the various switches and sensors mounted on the switch/sensor circuit board 200.

According to the embodiment of the deck for a magnetic recording/reproducing apparatus as described above, the plurality of structures constituting the mechanical mechanism are properly disposed in the signal chassis. And the plurality of switches and sensors for detecting an operational state of the deck are disposed on the signal typical PCB, and then the PCB is assembled to a lower surface of the chassis.

That is, according to an embodiment of the present invention, since the single chassis 100 and the signal switch/sensor circuit board 200 are employed, the height of the deck can be reduced, and therefore, the size of the deck can be minimized.

Further, since the lower priced PCB is used, the number of connecting portions can be reduced, thereby significantly reducing the manufacturing cost.

Furthermore, since the number of connecting portions is reduced, the degree of design freedom of the main circuit board can be enhanced.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A deck for a magnetic recording/reproducing apparatus, comprising:
    a chassis in which a plurality of structures constituting a mechanical mechanism for loading a tape and recording/reproducing information; and
    a switch/sensor circuit board in which a plurality of switches and sensors constituting an electronic mechanism for detecting an operation of the deck and a state of the structures, the plurality of switches and sensors including an Memory in Cassette (MIC) switch for recognizing a type of cassette tape, a start/end sensor for recognizing a start point and an end point of the tape, and a light-emitting device for radiating light to a start/end sensor;
    wherein the switch/sensor circuit board has a holder for supporting the light-emitting device and the switch/sensor circuit board is fixed to the chassis using hooks respectively formed at the holder and the MIC switch.

2. The deck as claimed in claim 1, wherein the switch/sensor circuit board is assembled to a lower surface of the chassis.

3. The deck as claimed in claim 1, wherein the plurality of structures constituting the mechanical mechanism comprise a reel assembly having a reel table for driving a reel of a cassette tape, a tape running guide assembly having a loading motor and a plurality of guide members for withdrawing the tape out of the cassette tape and then running the tape along a desired path, and a head drum assembly having a magnetic head for recording information or reproducing recorded information on the tape running along the desired path.

4. The deck as claimed in claim 3, wherein the plurality of switches and sensors constituting the electronic mechanism comprises a mode switch for controlling a mode, a humidity sensor, a cassette switch for detecting an insertion and withdrawal of the cassette tape and a reel sensor for checking the number of revolutions and an operational state of the reel table.

5. The deck as claimed in claim 4, wherein the switch/sensor circuit board is provided with a connector for outputting signals of the switches and the sensors.

6. The deck as claimed in claim 1, wherein the switch/sensor circuit board is further secured to the chassis by a screw.

7. A deck for a magnetic recording/reproducing apparatus, comprising:
    a reel assembly having a reel table for driving a reel of a cassette tape;
    a tape running guide assembly having a loading motor and a plurality of guide members for withdrawing a tape out of the cassette tape and then running the tape along a desired path;
    a head drum assembly having a magnetic head for recording information or reproducing recorded information on the tape running along the desired path;
    a chassis in which a plurality of components constituting the reel assembly, the tape running guide assembly and the head drum assembly are properly disposed; and
    a switch/sensor circuit board disposed at a lower surface of the chassis and comprising a mode switch for controlling a mode, a humidity sensor, a cassette switch for detecting an insertion and withdrawal of the cassette tape, an Memory in Cassette (MIC) switch for recognizing a type of cassette tape, a reel sensor for checking a number of revolutions and an operational state of the reel table, a start/end sensor for recognizing a start point and an end point of the tape, a light-emitting device for radiating light to the start/end sensor, and a connector for outputting signals from the switches and the sensors;
    wherein the switch/sensor circuit board has a holder for supporting the light-emitting device and the switch/sensor circuit board is fixed to the chassis using hooks respectively formed at the holder and the MIC switch.

* * * * *